(12) United States Patent
Clavette et al.

(10) Patent No.: US 7,294,993 B2
(45) Date of Patent: Nov. 13, 2007

(54) METHOD AND APPARATUS FOR CUSTOMIZING OF A POWER SUPPLY BASED ON LOAD CHARACTERISTIC DATA

(75) Inventors: Dan Clavette, Greene, RI (US); George Schuellein, Narraganfett, RI (US); Peter Cheng, Taipei (TW)

(73) Assignee: International Rectifier Corporation, El Segundo, CA (US)

( * ) Notice: Subject to any disclaimer, the term of this patent is extended or adjusted under 35 U.S.C. 154(b) by 350 days.

(21) Appl. No.: 10/926,435

(22) Filed: Aug. 25, 2004

(65) Prior Publication Data

US 2006/0043947 A1    Mar. 2, 2006

(51) Int. Cl.
*G05F 1/00* (2006.01)

(52) U.S. Cl. ...................... 323/282; 323/234; 323/207; 323/241; 323/285

(58) Field of Classification Search ................ 323/282, 323/234, 207, 241, 246, 278, 277, 285, 351; 237/143; 320/134
See application file for complete search history.

(56) References Cited

U.S. PATENT DOCUMENTS

| | | | | |
|---|---|---|---|---|
| 6,137,188 | A * | 10/2000 | Mitchell et al. | 307/29 |
| 6,448,806 | B1 * | 9/2002 | Roth | 326/16 |
| 6,465,993 | B1 * | 10/2002 | Clarkin et al. | 323/272 |
| 6,574,577 | B2 * | 6/2003 | Stapleton et al. | 702/117 |
| 6,694,272 | B1 * | 2/2004 | Zvonar | 702/64 |
| 6,772,356 | B1 * | 8/2004 | Qureshi et al. | 713/321 |
| 6,778,033 | B2 * | 8/2004 | Wong et al. | 331/185 |
| 6,965,502 | B2 * | 11/2005 | Duffy et al. | 361/18 |
| 7,020,786 | B2 * | 3/2006 | Vyssotski et al. | 713/300 |
| 2004/0150928 | A1 * | 8/2004 | Goodfellow et al. | 361/90 |
| 2006/0001408 | A1 * | 1/2006 | Southwell et al. | 323/282 |

OTHER PUBLICATIONS

Intersil (ISL6563), Two-Phase Multip-Phase Buck PWM Controller with Intergrated MOSFET Drivers, Data Sheet, Oct. 2003, FN9126. 19 pages.☐☐.*
National Semiconductor (application Note) (LM139/LM239/LM339), A Quad of Independently Functioning Comparators, Data Sheet, Jan. 1973. 23 pages.*
"Two-Phase Multi-Phase Buck PWM Controller with Integrated MOSFET Drivers", Intersil Data Sheet, FN9126, Oct. 2003, pp. 1-19.

* cited by examiner

*Primary Examiner*—Bao Q. Vu
*Assistant Examiner*—Nguyen Tran
(74) *Attorney, Agent, or Firm*—Ostrolenk, Faber, Gerb & Soffen, LLP (57) ABSTRACT

A power supply for powering an electrical load, the electrical load generating load characteristic data that determines a power supply characteristic to be provided to the electrical load from the power supply, the power supply comprising a voltage regulator for generating an output voltage to be provided as the input voltage for powering the electrical load, the voltage regulator being responsive to a reference signal for setting a characteristic of the power supply, and a control circuit for generating the reference signal for the regulator, the control circuit being responsive to the load characteristic data from the electrical load and to a selection input for selecting the type of electrical load from a plurality of electrical load types, whereby the selection input determines the type of electrical load to enable the load characteristic data to be evaluated by the control circuit to generate the reference signal for the regulator.

62 Claims, 8 Drawing Sheets

METHOD AND APPARATUS FOR CUSTOMIZING OF A POWER SUPPLY BASED ON LOAD CHARACTERISTIC DATA

BACKGROUND OF THE INVENTION

The present invention relates to power supplies, and in particular, to power supplies for providing low voltage, high current power to such devices as portable computers such as notebook and laptop computers.

Multi-phase buck converter switching power supplies are now in use for providing low voltage, high current, high efficiency power supplies for such applications as portable computers, for example, laptops and notebook computers.

The present invention relates to a power supply wherein the output voltage or other power supply characteristic, for example, over voltage protection limit, can be set depending on load characteristic data, such as digital voltage data codes known as VID codes received from the load microprocessor being powered by the power supply. In particular, the various microprocessor manufacturers, such as Intel, AMD etc., provide tables of the voltage power inputs for their microprocessors depending on operating conditions. The microprocessor issues voltage identification (VID) codes which contain digital bits that specify the input voltage required at a particular instant, depending on the processor activity. This enables the processor to conserve energy when the load requirements are low and receive more power when requirements are high. Each manufacturer uses different VID codes and the VID codes may be different for different processor chips made by the same manufacturer.

In the past, power supplies for computer systems required dedicated power supplies capable of interpreting the VID codes for a particular processor. However, these power supplies were not capable of interpreting the VID codes for processors other than the processor for which they were designed.

SUMMARY OF THE INVENTION

It is accordingly an object of the present invention to provide a power supply that is capable of responding to load characteristic data such as VID codes of a plurality of processor types and providing the required voltages and/or other requirements, such as over voltage protection limits in accordance with the load characteristics data.

The above and other objects of the invention are achieved by a power supply for powering an electrical load, the electrical load generating load characteristic data that determines a power supply characteristic to be provided to the electrical load from the power supply, the power supply comprising a voltage regulator for generating an output voltage to be provided as the input voltage for powering the electrical load, the voltage regulator being responsive to a reference signal for setting a characteristic of the power supply, and a control circuit for generating the reference signal for the regulator, the control circuit being responsive to the load characteristic data from the electrical load and to a selection input for selecting the type of electrical load from a plurality of electrical load types, whereby the selection input determines the type of electrical load to enable the load characteristic data to be evaluated by the control circuit to generate the reference signal for the regulator.

The above and other objects are furthermore achieved by a power supply for powering a microprocessor load, the microprocessor load generating digital voltage identification (VID) codes that determine the input voltage to be provided to the microprocessor load from the power supply, the power supply comprising a voltage regulator for generating an output voltage to be provided as the input voltage for powering the microprocessor load, the voltage regulator being responsive to a reference voltage for setting the output voltage; and a VID control circuit for generating the reference voltage for the regulator, the VID control circuit being responsive to the digital VID codes from the microprocessor load and to a selection input for selecting the type of microprocessor load from a plurality of microprocessor load types, whereby the selection input determines the type of microprocessor load to enable the VID codes to be evaluated by the VID control circuit to generate the reference voltage for the regulator.

The objects of the invention are also achieved by a method for powering an electrical load, the electrical load generating load characteristic data that determines a power supply characteristic to be provided to the electrical load from the power supply, the method comprising generating an output voltage to be provided as the input voltage for powering the electrical load in response to a reference signal for setting a characteristic of the power supply, and generating the reference signal for the regulator in response to the load characteristic data from the electrical load and to a selection input for selecting the type of electrical load from a plurality of electrical load types, whereby the selection input determines the type of electrical load to enable the load characteristic data to be evaluated to generate the reference signal for the regulator.

The above and other objects are also achieved by a method for powering a microprocessor load, the microprocessor load generating digital voltage identification (VID) codes that determine the input voltage to be provided to the microprocessor load from the power supply, the method comprising generating an output voltage to be provided as the input voltage for powering the microprocessor load in response to a reference voltage for setting the output voltage; and generating the reference voltage for the regulator in response to the digital VID codes from the microprocessor load and to a selection input for selecting the type of microprocessor load from a plurality of microprocessor load types, whereby the selection input determines the type of microprocessor load to enable the VID codes to be evaluated to generate the reference voltage for the regulator.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which.

DETAILED DESCRIPTION OF PREFERRED EMBODIMENTS OF THE INVENTION

Figure 1A:
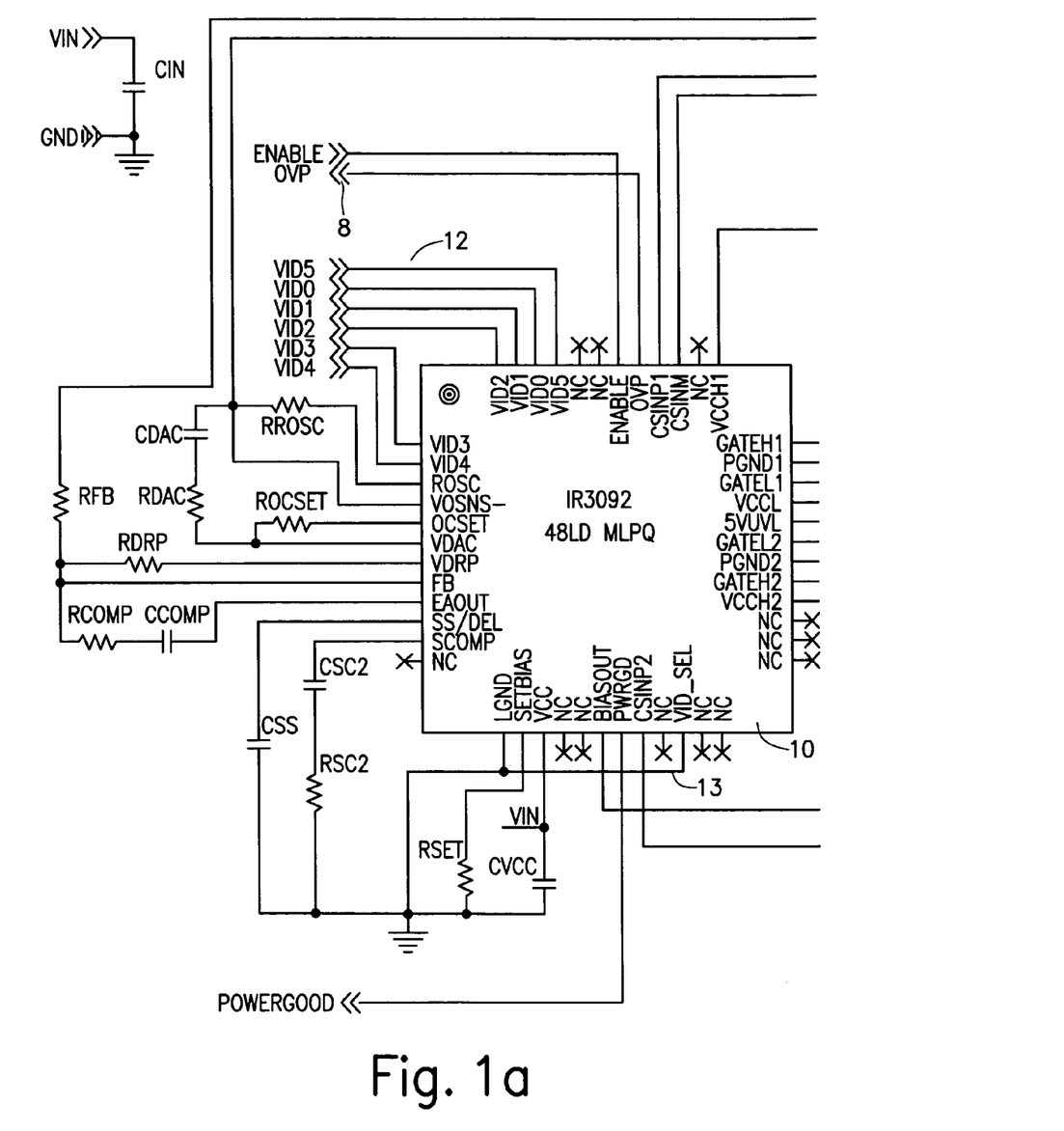
FIG. 1 shows an overall schematic diagram of a two phase converter switching regulator power supply and, in particular, for providing power to a portable computer such as a laptop.
Figure 1B:
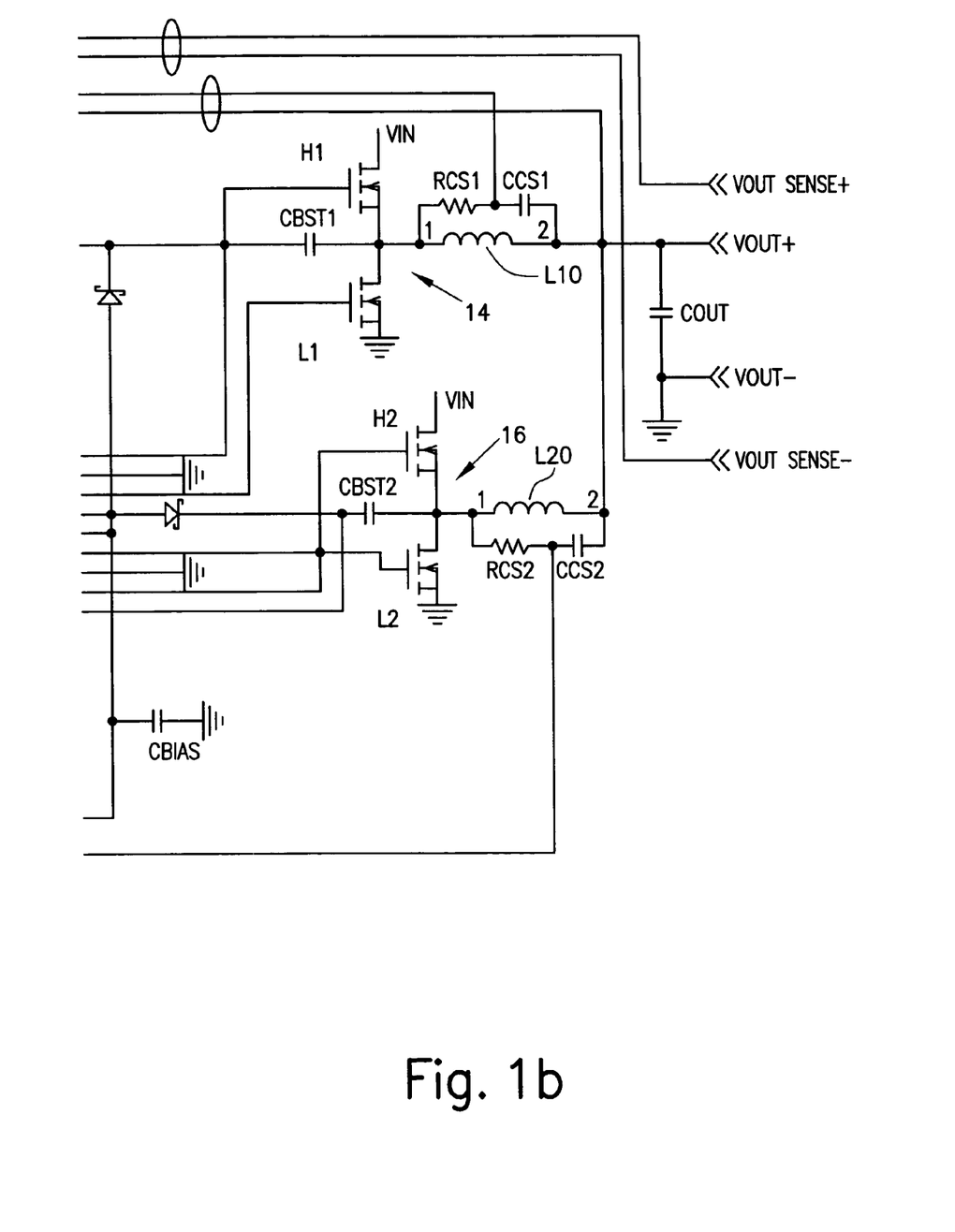

With reference to FIG. 1, the block diagram for a two-phase buck converter switching regulator power supply is shown. A control chip 10, whose block diagram is described with respect to FIG. 2 in more detail, receives a number of digital inputs VID0-VID5 referenced with 12 in FIG. 1. The VID inputs are received from the microprocessor being powered and are digital bits that will set the voltage output of the converter under various conditions. For example, for an Intel VR-10 chip, the output voltage varies between 0.8375V and 1.6000V depending on the setting of the digital bits on VID0 to VID5, as determined by the chip manufacturer. A pin VID_SEL (13) is used to indicate which processor chip is being powered, and this will enable control chip 10 to interpret the VID codes. For example, if VID SEL is grounded, the processor chip is an INTEL VR-10 and the VID codes will be interpreted to provide the proper voltage for this chip. If VID_SEL is at VCC, the processor is an AMD ATHLON. If VID_SEL is left open, the processor is an AMD HAMMER. For the ATHLON chip, the Vout range is from 1.100 to 1.850V. For the AMD HAMMER chip, the VOUT range is from 0.800 TO 1.550V. For all three processors, when all VID bits are 1, VOUT is disabled or OFF. In FIG. 1, VID_SEL is illustratively connected to ground, so control chip 10 will interpret he VID codes for the Intel VR-10 chip.

Returning to FIG. 1, power is provided at VIN from a suitable power source, typically a battery or an AC-DC transformer/rectifier. The control chip 10 has outputs GATE H1 and GATE L1 for driving the high side and low side transistors, respectively, of a first phase 14 of the multi-phase converter. Transistor H1 is the high side transistor and transistor L1 is the low side transistor.

Outputs GATE H2 and GATE L2 drive the second phase 16 comprising a high side transistor H2 and a low side transistor L2. Each set of transistors are arranged in a half bridge arrangement and their common connection is provided to respective output inductors L10 and L20. The other ends of inductors L10 and L20 are coupled together at a common output node VOUT+. The output is taken across an output capacitor COUT coupled between VOUT+ and ground (VOUT-).

The output voltage is sensed between VOUTSNS+ and VOUTSNS- which are respectively applied to a feedback FB input and VOSNS- input of the control chip 10. Current senses for each phase are provided at inputs CSINP1 and CSINP2, respectively. The current is sensed through lossless average inductor current sensing. The series resistor RCS1 and capacitor CCS1 for phase one are connected in series across the inductor L10. The voltage across the capacitor is sensed. The resistor RCS1 and capacitor CCS1 are chosen so that the time constant of RCS1 and CCS1 equals the time constant of the inductor which is the inductance of L10 divided by the inductor DC resistance. When the two time constants match, the voltage across CCS1 is proportional to the current in L10 and the sense circuit can be treated as if only a sense resistor with the value of RL (the DC resistance of L10) was used. A mismatch of the time constants does not affect the measurement of inductor DC current but affects the AC component of the inductor current. The advantage of sensing the inductor current verses high side or low side sensing is that actual output current being delivered to the load is sensed rather than peak or sampled information about the switch currents. The output voltage can be positioned to meet a load line based on real time information. Except for a sense resistor in series with the inductor, this is the only sense method that can support a single cycle transient response. Other methods provide no information during either load increase (low side sensing) or load decrease (high side sensing). The other phase two has a sensing resistor RCS2 and capacitor CCS2 and functions in the same way.

Figure 2A:
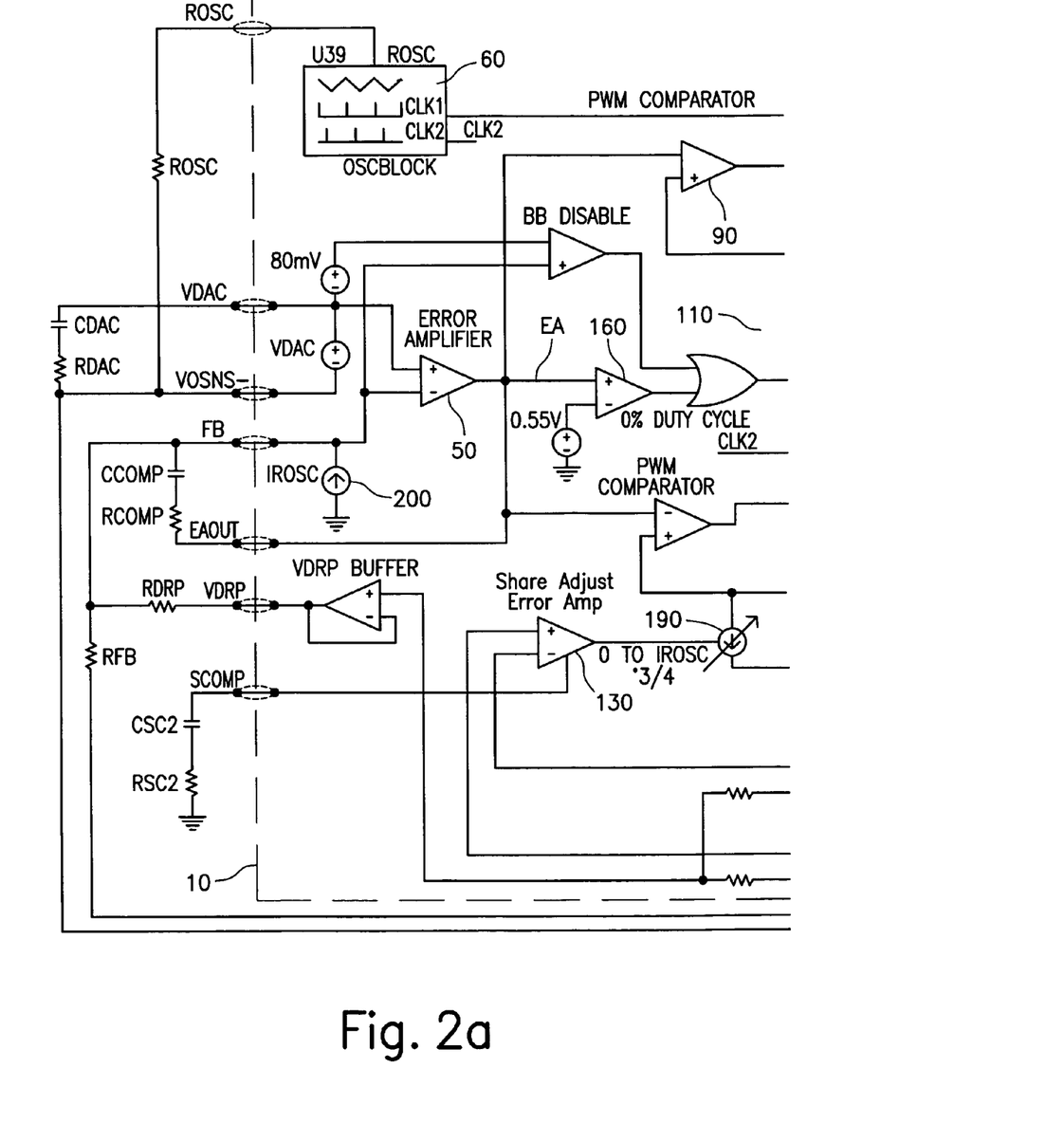
FIG. 2 shows the block diagram of the two phase converter of FIG. 1.
Figure 2B:
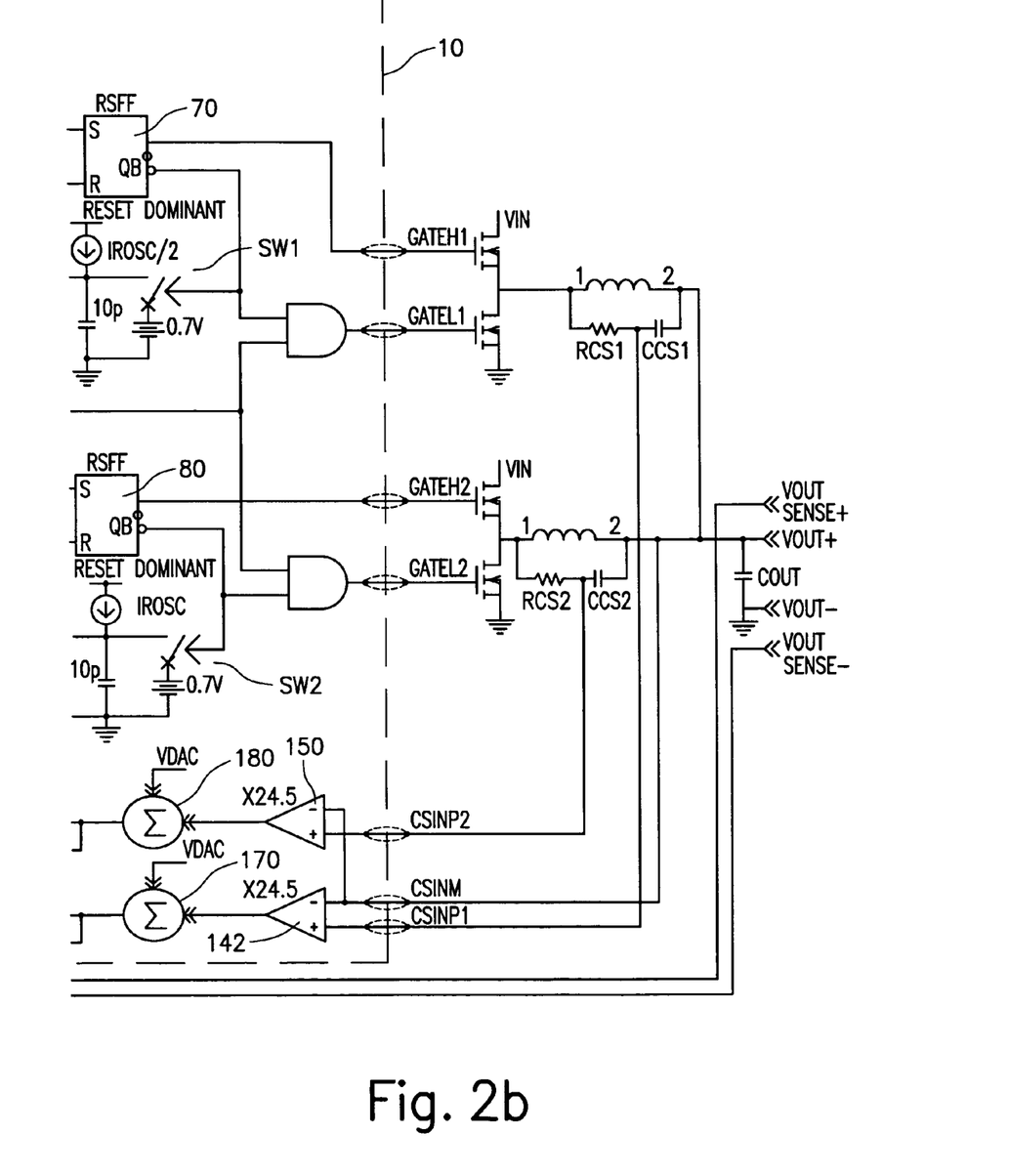

The block diagram of the control chip 10 is shown in more detail in FIG. 2. Voltage mode control with trailing edge modulation is used. A high gain, wide bandwidth voltage type error amplifier 50 is used in a voltage control loop. Output voltage sensing is provided at input FB which is provided to the inverting input of the error amplifier. The other, noninverting input is coupled to a voltage reference VDAC, which is set by the VID and VID_SEL pins as shown and described with reference to FIG. 1 above. The VID_SEL pin in FIG. 1 is shown grounded for the Intel VR10 chip. For other processors, for example, the AMD HAMMER or ATHLON processors, the VID_SEL pin is connected to a different potential or left open. For the AMD HAMMER processor, VID_SEL is open. For the AMD ATHLON chip, VID_SEL is connected to VCC. The setting of VDAC will determine the reference voltage VDAC for the error amplifier 50, and thus set the output voltage.

The control chip 10 includes an oscillator 60 which is programmable using an external resistor ROSC. The oscillator generates an internal 50 percent duty cycle sawtooth signal as shown in FIG. 3A. The 50 percent duty cycle sawtooth signal of FIG. 3A is used to generate two 180° out of phase timing pulse signals that set the phase 1 and phase 2 RS Flip Flops 70 and 80. The timing pulses are shown in FIGS. 3B and 3C and indicated in FIG. 2 as CLK1 and CLK2.

Figure 3:
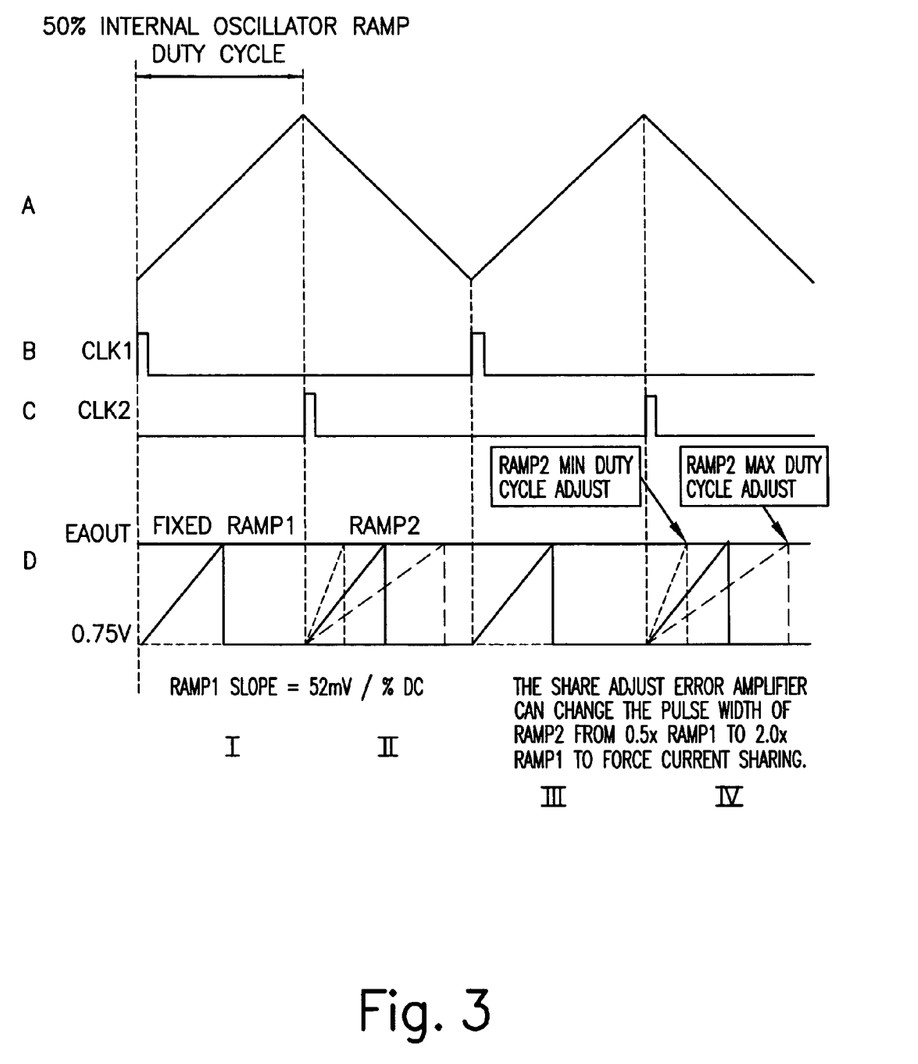
FIG. 3 shows waveforms in the circuit of FIG. 2.

With reference to FIGS. 2 and 3, each flip flop 70 and 80, upon receiving a clock pulse, is set. Furthermore, a respective ramp voltage is provided to respective PWM comparators 90 and 100 at their non-inverting inputs. The error amplifier 50 output is provided to the inverting inputs of each of the PWM comparators. The PWM comparator 90 is provided with a fixed slope ramp voltage provided by current charging through a capacitor 10 from a current source IROSC/2. When the flip flop 70 is set, the low side switch L1 is turned off and the high side switch H1 is turned on. See also FIGS. 4A, C and D. A switch SW1 across capacitor 110 is opened by the QB output of Flip Flop 70, allowing the capacitor 10 to begin charging to provide the ramp voltage to PWM comparator 90. Likewise, in the other phase controlled by flip flop 80, the low side driver is turned off and the high side driver turned on upon receiving a clock pulse and a capacitor 120 begins to charge when a switch SW2 is opened by the QB output of flip flop 80.

For phase 1, the capacitor 10 is charged by a current source that is proportional to the switching frequency resulting in a fixed slope ramp rate of approximately 57 milivolts per percent duty cycle. For example, the steady state operating switch mode duty cycle is 10 percent and the internal ramp amplitude is typically 570 milivolts from the starting point to the time when the ramp crosses the output voltage of the error amplifier EAOUT as shown in FIG. 3D. In FIG. 3D, the fixed slope ramp signal provided to the non-inverting input of PWM comparator 90 is shown in the first and third quadrants of the graph.

In contrast, the PWM comparator 100 for the second phase is provided with a variable slope ramp voltage which is shown in the second and fourth quadrants of FIG. 3D and which will be explained in further detail below. For phase 1, when the PWM ramp voltage exceeds the error amplifier output voltage, the flip flop 70 is reset. This turns off the high side switch H 1 and turns on the low side switch L1 and discharges the PWM ramp to 0.7V until the next clock pulse. Flip Flop 80 and comparator 100 of phase 2 operate in similar fashion, although, as explained below, the slope of the ramp signal provided to the non-inverting input of comparator 100 is variable.

Each flip flop 70, 80 is reset dominant, allowing both phases to go to zero duty cycle within a few tens of nano-seconds in response to a load step decrease. Phases can overlap and go to 100% duty cycle in response to a load step increase with turn-on gated by the clock voltage. An error amplifier output voltage greater than the common mode input range of the PWM comparator results in 100% duty cycle regardless of the voltage of the PWM ramp. This arrangement ensures that the error amplifier 50 is always in control and can demand 0-100% duty cycle if required. It also favors response to a load step decrease which is appropriate given the low output to input voltage ratio of most systems. The inductor current will increase much more rapidly than decrease in response to load transients.

This control method is designed to provide a single cycle transient response where the inductor current changes in response to load transients within a single switching cycle, maximizing the effectiveness of the power supply and minimizing the output capacitor requirements.

As discussed above, the ramp signals to the comparators 90 and 100 are different. The PWM comparator 90 receives a fixed slope ramp voltage as shown in quadrants 1 and III of FIG. 3D. The PWM comparator 100, in contrast, receives a variable slope ramp voltage as sown in Quadrants II and IV of FIG. 3D at its non-inverting input. This variable slope ramp voltage is adjusted by a share adjust error amplifier 130 in response to inputs CSINP1 and CSINP2.

The current sharing between the two phases is achieved by a master-slave current share loop topology. The output of the phase 1 current sense amplifier 140 sets a variable reference for the share adjust error amplifier 130. The share adjust error amplifier will then adjust the duty cycle of the PWM ramp 2 by adjusting its slope, as shown in FIG. 3D by the dashed lines, to force the input error of the share adjust amplifier to zero, resulting in accurate current sharing between the two phases.

The maximum and minimum duty cycle adjust range of ramp 2 compared to ramp 1 in the preferred embodiment is limited to 0.5× and 2.0× the master or fixed slope (phase 1) ramp signal. This is shown by the slope of the ramp voltage provided to the phase 2 PWM comparator 100 in FIG. 3D. Minimum duty cycle is shown by the ramp signal with the highest slope in FIG. 3D. The maximum duty cycle is shown by the ramp with the lowest slope in FIG. 3D.

The cross-over frequency of the current share loop can be programmed with a capacitor at the SCOMP input terminal so that the share loop does not interact with the output voltage loop. The SCOMP capacitor is driven by a transconductance stage capable of sourcing and sinking 25 microramps. The duty cycle of ramp 2 inversely tracks the voltage on the SCOMP pin. If the voltage SCOMP increases, the slope of the ramp provided to PWM comparator 100, that is, the phase 2 comparator, will increase and the respective duty cycle will decrease resulting in a reduction in the output current of phase 2. Due to the limited 25 microamp source current, an SCOMP precharge circuit is included to precondition V(SCOMP) so that the duty cycle of the ramp signal provided to PWM comparator 100 is equal to the duty cycle of ramp 1 prior to any gate pulses provided to the high side transistors.

As shown in FIGS. 2 and 3, the fixed ramp charges from a current source IROSC/2. The variable slope ramp charges at IROSC, but is shunted by a variable current sink 190, that sinks current in a range from 0 to IROSC ×3/4. Thus, the range of current charging capacitor 120 ranges from IROSC to IROSC/4, that is, from 2× to ½ the charging rate of capacitor 110 in the fixed slope ramp generator circuit.

Figure 4:
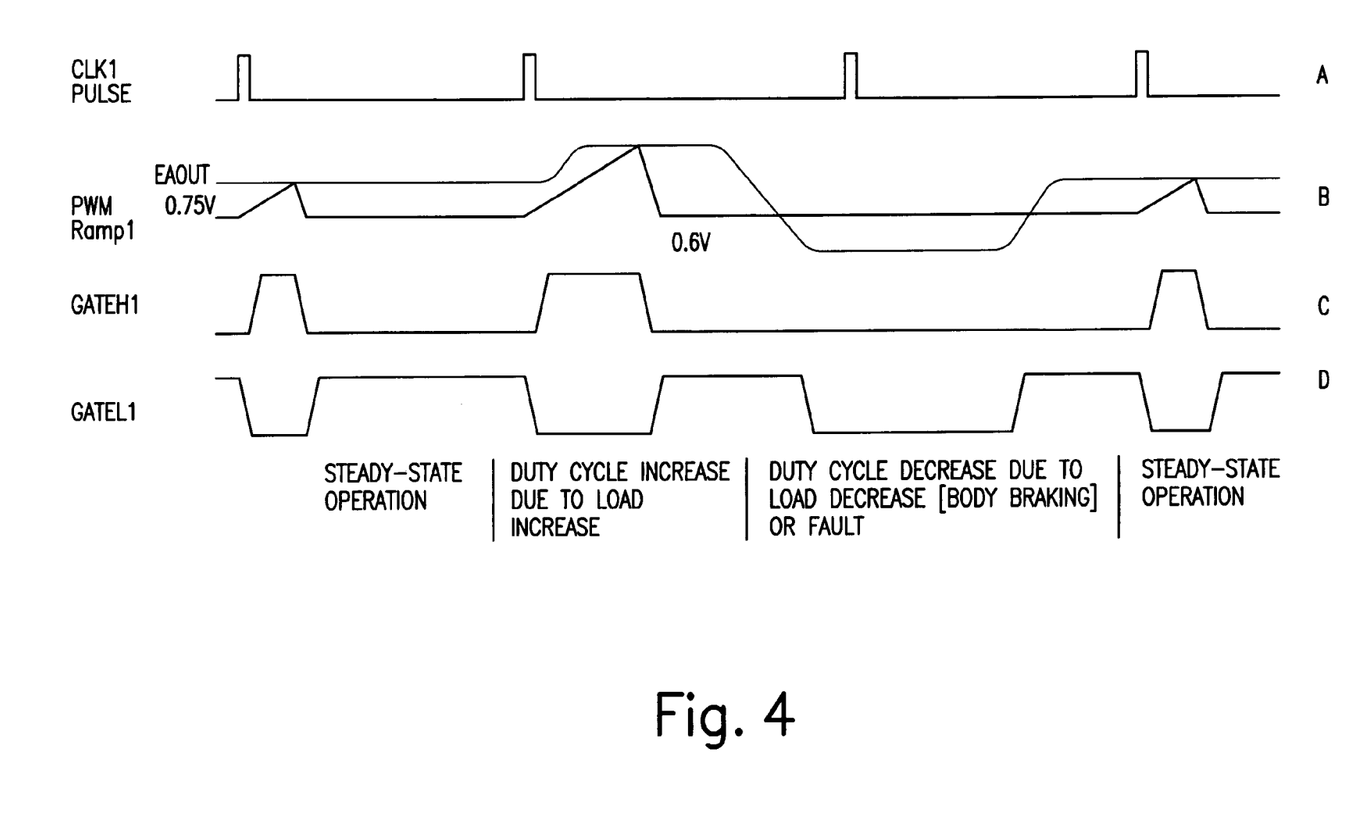
FIG. 4 shows further waveforms of the circuit of FIG. 2.

FIG. 4 depicts the PWM operating waveforms under various conditions for the first phase. The second phase is similar, except that the PWM ramp 2, unlike PWM ramp 1, has a variable slope. The CLK1 pulses are shown being provided to the flip flop 70. The error amplifier 50 output voltage EAOUT is shown in FIG. 4B for various load conditions. As shown in the left hand portion of FIG. 4B, when the ramp voltage to PWM comparator 90, herein identified as PWM ramp 1, equals the error amplifier 50 output voltage, the high side transistor is turned off and the low side transistor is turned on as shown in FIGS. 4C and 4D. At the next clock pulse (CLK1), the error amplifier output has increased, indicating that the output voltage has dropped due to higher current demands. Accordingly, the ramp voltage will equal the error amplifier voltage only after the ramp voltage has increased to a higher voltage level. This will ensure that the high side transistor has an increased duty cycle, that is, the pulse width is longer as shown in FIG. 4C, thus increasing the output current supplied to the phase 1 inductor. Correspondingly, the low side transistor will be off for a longer period of time as shown in FIG. 4D.

By the third clock pulse, as shown in FIG. 4, the error amplifier input is nearly zero, thus indicating that the current demands have decreased or there is a fault. If the error amplifier's output voltage drops below 0.55 volts, a zero percent duty cycle comparator 160 (FIG. 2) also turns off the low side transistor. As shown, the high side transistor is also off during this period.

By the fourth clock pulse of FIG. 4, the error amplifier output voltage has again increased and the ramp is shown in FIG. 4B and the gate drives are as shown in FIGS. 4C and 4D.

As shown in FIG. 3C, the circuit allows sharing of current by adjusting the slope of the ramp voltage to at least one, but not all of the PWM comparators. For a two phase converter, the slope of the ramp for only one phase is adjusted. For a three phase converer, two ramp slopes are adjusted. The slope of the ramp provided to the first comparator 90 provided at its non-inverting input is always constant as shown by fixed ramp 1 in FIG. 3D. For example, if the current demanded in phase I increases, this will be sensed at the node of resistor RCS1 and CCS1. The increased current will be reflected at the non-inverting input of amplifier 140, which is added to voltage VDAC by a summing stage 170. The increased output of the summing stage 170 is provided to the non-inverting input of the share adjust error amplifier 130, increasing the output of the share adjust error amplifier. This will increase the current through the current source 190, shunting current away from the capacitor 120, thereby increasing the time required to charge capacitor 120. The slope will flatten out as shown in FIG. 3D by the ramp 2 waveform having a longer duty cycle. This will cause the output of the PWM comparator 100 to stay low longer, thus ensuring that the flip flop 80 will remain set, keeping the high side transistor H2 on for a longer period of time, thus increasing the current available from the second phase. Thus, the second phase matches an increased current demanded by the first phase. As the second phase current increases, the first phase will compensate by decreasing until both phase currents are equal. This will occur because the error amplifier output will also decrease as the current supplied by the second phase increases.

Similarly, should the current in the second phase increase as sensed by the sense voltage CSINP2, the output of amplifier 150 will increase and hence the inverting input to the share adjust error amplifier 130 will increase, decreasing the output of the share adjust error amplifier. This will decrease the current shunted by current source 190, allowing capacitor 120 to charge more quickly and thus the ramp 2 voltage has a higher slope as indicated in FIG. 3D. Thus, the PWM comparator output will go high more quickly, resetting flip flop 80 and thereby turning off the high side transistor H2 thereby decreasing the current supplied by the second phase. At the same time, the error amplifier 50 output will have increased, thus lengthening the on time of the high side transistors of both phases. To compensate for the decreased current caused by the reduced ramp 2 slope, the first phase will supply current to match the reduced current supplied by the second phase. The current supplied by the two phases will be driven such that the error across the share adjust error amplifier inputs is driven to zero.

Conversely, should the current in phase 1 decrease, the non-inverting input of amplifier 130 will decrease, causing the output of amplifier 130 to decrease, resulting in capacitor 120 charging more quickly, turning off the high side transistor of phase 2 more quickly, reducing the phase 2 current to match phase 1.

Should the current in phase 2 decrease, the voltage at the inverting input of amplifier 130 will decrease, causing capacitor 120 to charge less quickly, increasing the current supplied by the phase 2 transistors. The phase 1 transistors will compensate by decreasing the current they supply to match the phase 2 transistors. Once the amplifier 130 inputs are equal, the output phase currents will be equal.

In all cases, although the error amplifier 50 output tracks the output current demands (it increases when the output current demand increases and decreases when the output current demand decreases), the share adjust amplifier 130 operates to equalize the currents in the plurality of phases. Accordingly, although the error amplifier 50 will operate to increase or decrease the current in all phases, as demanded by the load, the share adjust amplifier will operate to increase or decrease the currents supplied by the phases having PWM comparators driven by variable slope ramp signals to equalize the load currents in all the phases.

Figure 5A:
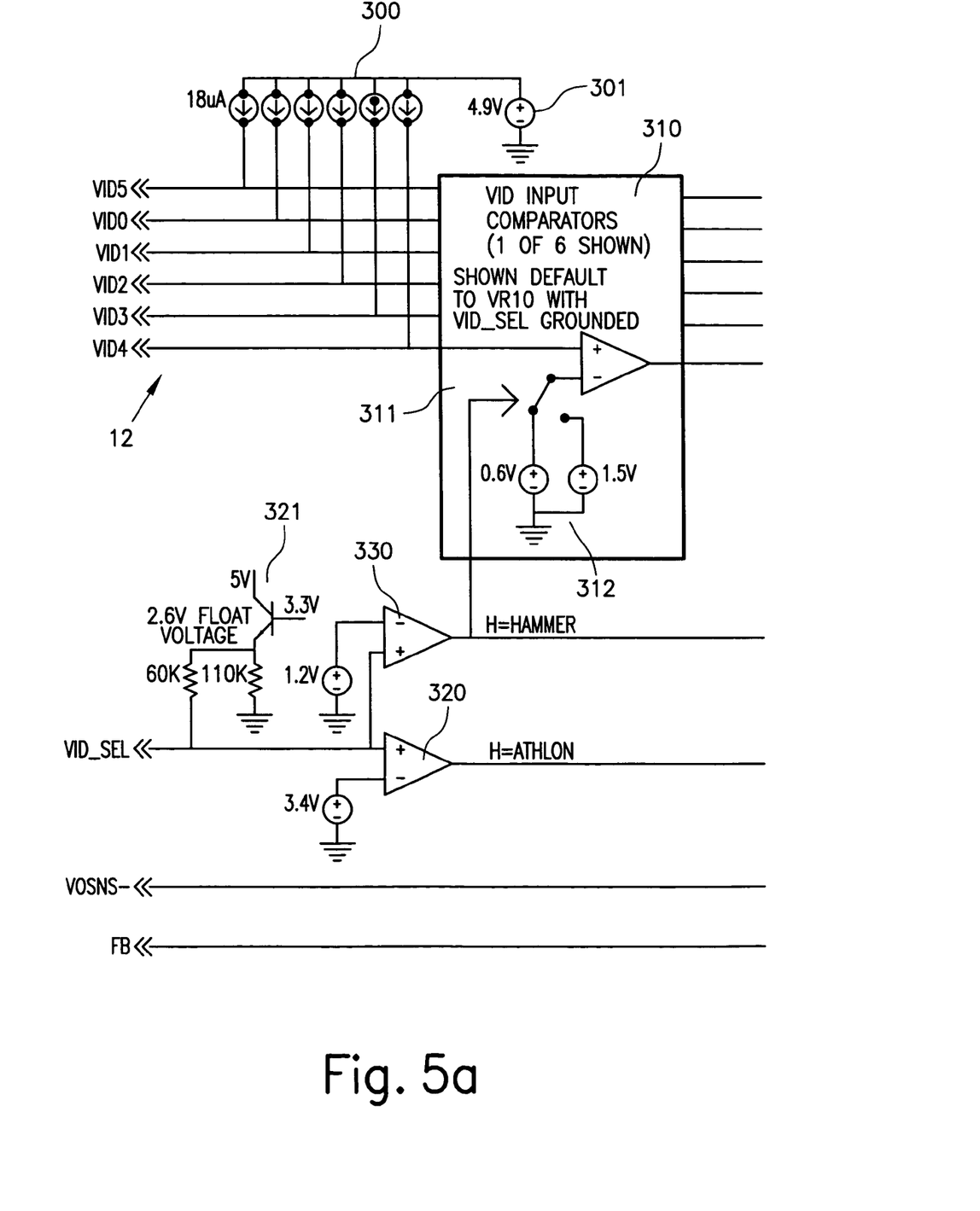
FIG. 5 show the block diagram of the VID control portion of the circuit of FIG. 1 for setting the output voltage of the converter and over-voltage protection limit in accordance with the VID code and selection input.
Figure 5B:
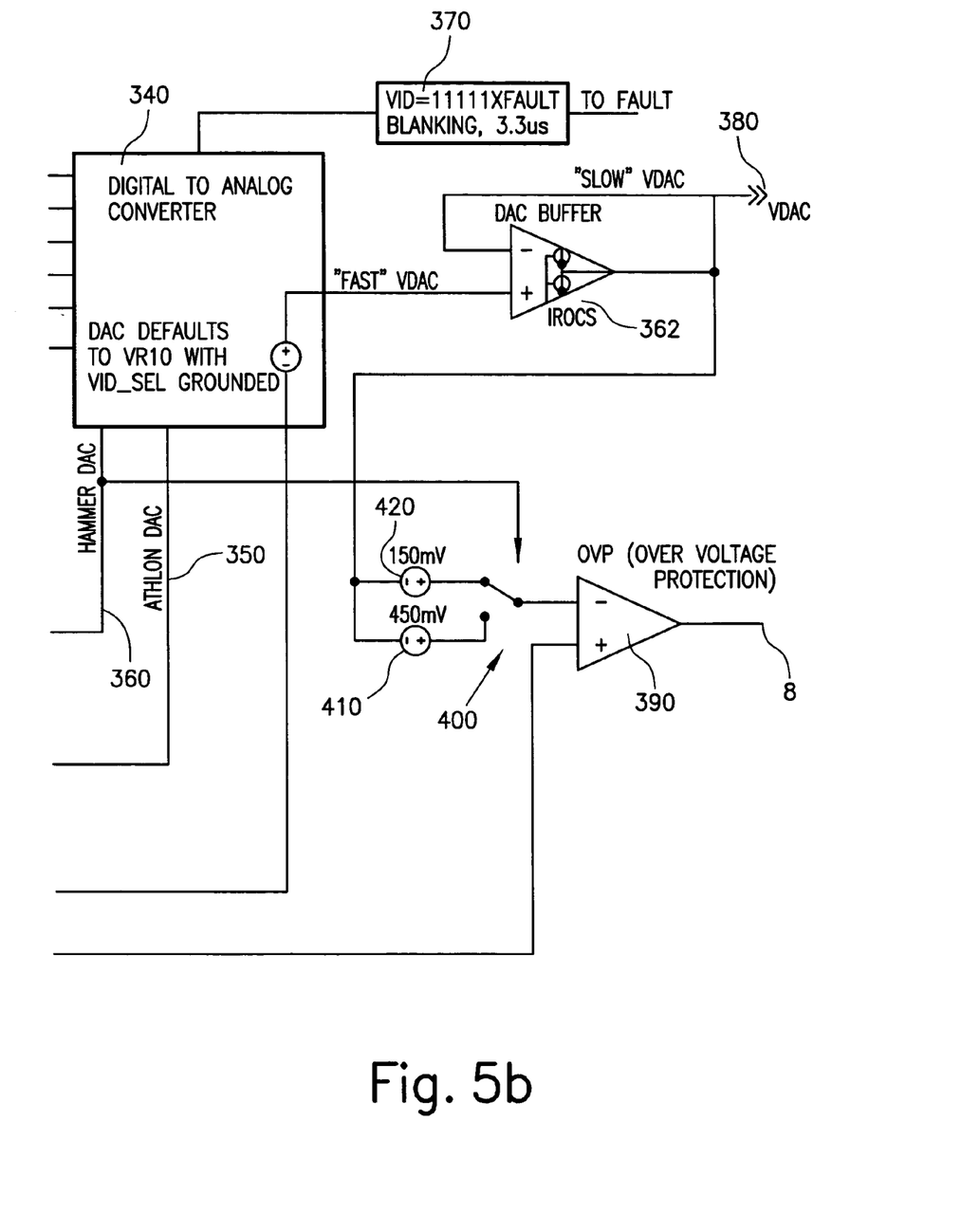

FIG. 5 shows details of the VID control circuitry for setting the output voltage of the converter.

The VID codes are received from the microprocessor at the VID inputs 12. The VID inputs 12 are each pulled up by respective current sources 300, for example, 18 µA current sources that pull up the inputs to 4.9 V, as shown by voltage source 301. Block 310 comprises a plurality of VID input comparators 310A to 310F (one for each VID input) having a threshold voltage 312. Only comparator 310A is shown. The threshold voltage 312 is determined by the input on VID_SEL. For the Intel VR-10 processor (HAMMER OR ATHLON), the threshold is 0.6V and for the AMD processors, the threshold is 1.5V for the AMD chips. When VID_SEL is open or at VCC, the threshold will be 1.5V. When VID_SEL is at ground, the threshold will be set to 0.6V for the Intel VR-10 Chip.

When VID_SEL is at ground potential, the outputs of comparators 320 and 330 will both be low, and this will inform Digital to Analog Converter (DAC) 340 that the VID codes should be interpreted for the Intel VR-10 chip. When inputs 350 and 360 are both low, the DAC 340 defaults to the Intel VR-10 chip VID codes. The low output of comparator 330 will also select the 0.6V threshold via switch 311.

When VID_SEL is open, the comparator 320 output will be low. When VID-SEL is open, the current source 321 will pull up VID-SEL to a voltage below the 3.3V reference for comparator 320, so its output will be low. However, the output of comparator 330, which has a 1.2V reference will be high, and thus input 360 will be high, instructing DAC 340 to interpret the VID codes for the AMD HAMMER Chip. At the same time, the high output of comparator 330 selects, via switch 311, the 1.5V threshold for the VID input comparators 310.

If VID_SEL is at VCC, then the outputs of comparators 320 and 330 are both high, thus informing DAC 340 that the VID codes should be interpreted for an AMD ATHLON processor chip. The high output of comparator 330 also selects the 1.5V threshold for VID input comparators 310.

Depending on the input VID bits, as decoded by comparators 310, DAC 340 will provide a reference voltage VDAC 380 via trans-conductance DAC buffer 360 to the error amplifier 50, described in connection wit FIGS. 2-4, to set the converter output voltage. The VDAC voltage is trimmed to the Error Amplifier output voltage with EAOUT tied to FB via an accurate resistor. This compensates DAC Buffer input offset, Error Amplifier input offset, and errors in the generation of the FB bias current which is based on $R_{ROSC}$. This trim method provides a 0.5% system accuracy.

The VID control circuit of FIG. 5 can accept changes in the VID code while operating and vary the VDAC voltage accordingly. The circuit detects a VID change and blanks the DAC 340 output response for 400 ns via blanking circuit 370 to verify the new code is valid and not due to skew or noise. The sink/source capability of the VDAC buffer amp 362 is programmed by the same external resistor that sets the oscillator frequency, $R_{ROSC}$, described previously. The slew rate of the voltage at the VDAC pin 380 can be adjusted by an external capacitor CDAC between VDAC pin and the VOSNS− pin. See FIG. 1. A RDAC resistor connected in series with this capacitor is used to compensate the VDAC buffer amplifier. See FIG. 1. Digital VID transitions result in a smooth analog transition of the VDAC voltage and converter output voltage minimizing inrush currents in the input and output capacitors and overshoot of the output voltage.

Adaptive voltage positioning is used to reduce output voltage deviations during load transients and power dissipation of the load when it is drawing maximum current. The circuitry related to voltage positioning is shown in FIG. 2. Resistor RFB is connected between the inverting input of error amplifier 50 (pin FB) and the converter output voltage. An internal current source 200 whose value is programmed by the same external resistor that programs the oscillator frequency, $R_{ROSC}$, pumps current out of the FB pin. The FB bias current develops a positioning voltage drop across RFB which forces the converter's output voltage lower to V(VDAC)-I(FB)* RFB to maintain a balance at the error amplifier 50 inputs. RFB is selected to program the desired amount of fixed offset voltage below the DAC voltage.

The voltage at the VDRP pin is an average of both phase current sense amplifiers 140 and 150 and represents the sum of the VDAC voltage and the average inductor current of all the phases. The VDRP pin is connected to the FB pin through the resistor RDRP. The error amplifier 50 forces the voltage on the FB pin to equal VDAC through the power supply loop. Therefore, the current through RDRP is equal to (VDRP-VDAC)/$R_{DRP}$. As the load current increases, the VDRP voltage increases accordingly, which results in an increased RFB current, further positioning the output regulated voltage lower, thus making the output voltage reduction proportional to an increase in load current. The droop impedance or output impedance of the converter can thus be programmed by the resistor RDRP. The offset and slope of the converter output impedance are independent of the VDAC voltage.

AMD specifies the acceptable power supply regulation window as ±50 mV around AMD's specified VID table voltages. The VID table voltages are available in specifications from the chip manufacturers. Intel, for the VR-10.0, specifies the VID table voltages at the absolute maximum power supply voltage. In order to have all three DAC options, the HAMMER and ATHLON DAC output voltages are pre-positioned 50 mV higher than listed in AMD specifications. During testing, a series resistor is placed between EAOUT and FB to cancel the additional 50 mV out of the digital to analog converter. The FB bias current, equal to IROSC, develops the 50 mV cancellation voltage. Trimming the VDAC voltage by monitoring V(EAOUT) with this 50 mV cancellation resistor in circuit also trims out errors in the FB bias current.

The VDRP pin voltage represents the average current of the converter plus the DAC voltage. The load current can be retrieved by subtracting the VDAC voltage form the VDRP voltage.

FIG. 5 shows that the invention can determine or set other characteristics of the power supply in addition to the power supply output voltage. For example, the invention can be used to set the OVP (over-voltage protection) limit. Referring to FIG. 1, the control chip 10 has an OVP input 8. OVP input 8 sets the over-voltage protection limit for the power supply. For Intel chips, the OVP limit is 150 mV above VDAC. For AMD, it is 450 mV above VDAC. To accomplish this, an OVP comparator 390 is provided responsive to voltage FB (the output voltage of the power supply) and a selected voltage VDAC+150 mV or VDAC+450 mV. If VID_SEL is either at VCC or floating, line 360 will be high, meaning the load is an AMD chip, so switch 400 selects reference voltage 410 (450 mV). If line 360 is low, the load is as Intel VR-10.0 chip and reference voltage 420 (150 mV) is selected. Although the invention has been illustrated with reference to controlling the output voltage and OVP limit, it should be appreciated that other outputs or characteristics of the power supply can be similarly customized to the load by the invention.

Although the present invention has been described with reference to a 2 phase converter, the invention is also applicable to any type of power supply, for example, a single phase converter or converter having more than 2 phases or a non-converter power supply.

Also, although the invention has been described with reference to selecting between three load types (Intel VR-10.0, AMD ATHLON and AMD HAMMER), those of skill in the art will appreciate that the invention can be expanded to four or more load types, for example, four or more different microprocessor types. This can be accomplished by suitably designing the selection circuitry responsive to the VID-SEL pin so that it can discriminate between 4 or more procesor types. For example, as shown in FIG. 5, the VID-SEL pin provides three levels to the selection circuitry; ground, VCC and floating. To expand the circuit to accommodate four load types, a fourth level on VID-SEL can be provided (for example, a voltage level VBIAS between ground and VCC) and the selection circuitry appropriately redesigned, for example, by adding a further comparator or comparators.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A power supply for powering an electrical load, the electrical load generating load characteristic data that determines a power supply characteristic to be provided to the electrical load from the power supply, the power supply comprising:
    a voltage regulator for generating an output voltage to be provided as the input voltage for powering the electrical load, the voltage regulator being responsive to a reference signal for setting a characteristic of the power supply; and
    a control circuit for generating the reference signal for the voltage regulator, the control circuit being responsive to the load characteristic data from the electrical load and to a selection input from one selection pin for selecting one of three or more electrical load types, each electrical load type having an assigned voltage range, the selection being performed using the one selection pin with respect to a common pin,
    whereby the selection input determines the type of electrical load to enable the load characteristic data to be evaluated by the control circuit to generate the reference signal for the regulator, wherein a first type of electrical load is selected when the selection pin is at a first voltage rang, a second type of electrical load is selected when the selection pin is at a second voltage range, and a third type of electrical load is selected when the selection pin is at a third voltage range.

2. The power supply of claim 1, wherein the electrical load comprises a microprocessor load and the plurality of electrical load types comprise a plurality of microprocessor load types.

3. The power supply of claim 1, wherein the power supply characteristic comprises an output voltage of the power supply and the reference signal comprises a reference voltage of the voltage regulator.

4. The power supply of claim 1, wherein the power supply characteristic comprises an over-voltage protection limit and the reference signal comprises an over-voltage protection limit voltage.

5. The power supply of claim 3, wherein the electrical load comprises a microprocessor load and the plurality of electrical load types comprisea plurality of microprocessor load types and wherein the load characteristic data comprises digital voltage identification (VID) codes related to respective ones of the plurality of microprocessor load types and the control circuit comprises: a VID control circuit comprising a digital to analog converter receiving the selection input for converting an input VID code to the reference voltage.

6. The power supply of claim 5, wherein the VID control circut further comprises: a plurality of VID input comparators having respective bits of the VID codes as inputs for comparing the respective bits to a threshold voltage.

7. The power supply of claim 6, wherein the plurality of VID input comparators each have one input coupled to a threshold voltage and a second input coupled to receive a respective bit of the VID code inputs, and wherein the threshold voltage is selectable from a plurality of threshold voltages in response to said selection input.

8. The power supply of claim 7, wherein said digital to analog converter receives inputs from said plurality of VID input comparators.

9. The power supply of claim 8, further comprising a buffer circuit receiving an output from said digital to analog converter and for providing said reference voltage to said regulator.

10. The power supply of claim 8, wherein the regulator comprises a switching regulator.

11. The power supply of claim 8, wherein the switching regulator comprises a buck converter.

12. The power supply of claim 11, wherein the switching regulator comprises a multiphase buck converter.

13. The power supply of claim 11, wherein the reference voltage is provided to an input of an error amplifier of said buck converter.

14. The power supply of claim 7, further comprising a comparator circuit receiving said selection input as an input, said comparator circuit providing a first signal to said digital to analog converter to enable said digital to analog converter to convert said VID codes to the reference voltage and further providing a second signal to said plurality of VID input comparators to select the threshold voltage for said plurality of VID input comparators.

15. The power supply of claim 14, wherein said plurality of VID input comparators further include a switching circuit responsive to said second signal to select the threshold voltage.

16. The power supply of claim 5, further comprising a circuit for selection of an over-voltage protection limit, the selection circuit comprising a comparator responsive to an OVP reference voltage and the output voltage of the power supply, the OVP reference voltage being selected by a selection switch responsive to the selection input, wherein the selection is performed using said one selection pin with respect to said common pin.

17. A method for powering an electrical load, the electrical load generating load characteristic data that determines a power supply characteristic to be provided to the electrical load from the power supply, the method comprising:
    generating an output voltage to be provided as the input voltage for powering the electrical load in response to a reference signal for setting the characteristic of the power supply; and
    generating the reference signal for the voltage regulator in response to the load characteristic data from the electrical load and to a selection input from one selection pin for selecting one of three or more electrical load types, each electrical load type having an assigned voltage range, the selection being performed using the one selection pin with respect to a common pin,
    whereby the selection input determines the type of electrical load to enable the load characteristic data to be evaluated to generate the reference signal for the regulator,
    wherein a first type of electrical load is selected when the selection pin is at a first voltage range, a second type of electrical load is selected when the selection pin is at a second voltage range, and a third type of electrical load is selected when the selection pin is at a third voltage range.

18. The method of claim 17, wherein the electrical load comprises a microprocessor load and the plurality of electrical load types comprise a plurality of microprocessor load types.

19. The method of claim 17, wherein the power supply characteristic comprises an output voltage of the power supply and the reference signal comprises a reference voltage of the voltage regulator.

20. The method of claim 17, wherein the power supply characteristic comprises an over-voltage protection limit and the reference signal comprises an over-voltage protection limit voltage.

21. The method of claim 17, further wherein the electrical load comprises a microprocessor load and the plurality of electrical load types comprise a plurality of microprocessor load types and wherein the load characteristic data comprises digital voltage identification (VID) codes related to respective ones of the plurality of microprocessor load types and further comprising:
    receiving the selection input and converting a digital input VID code to the reference voltage.

22. The method of claim 21, further comprising: providing a plurality of VID
    input comparators having respective bits of the VID codes as inputs for comparing the respective bits to a threshold voltage.

23. The method of claim 21, wherein the plurality of VID input comparators each have one input coupled to a threshold voltage and a second input coupled to receive a respective bit of the VID code inputs, and further comprising selecting from a plurality of threshold voltages in response to said selection input.

24. The method of claim 23, wherein, prior to said step of converting, receiving inputs from said plurality of input VID comparators.

25. The method of claim 24, further comprising buffering said reference voltage and providing a buffered reference voltage to said regulator.

26. The method of claim 24, wherein the regulator comprises a switching regulator.

27. The method of claim 24, wherein the switching regulator comprises a buck converter.

28. The method of claim 27, wherein the switching regulator comprises a multiphase buck converter.

29. The method of claim 27, further comprising providing the reference voltage to an input of an error amplifier of said buck converter.

30. The method of claim 23, further comprising receiving said selection input as an input, and providing a first signal to enable a digital to analog converter to convert said VID codes to the reference voltage and further providing a second signal to said plurality of VID input comparators to select the threshold voltage for said plurality of VID input comparators.

31. The method of claim 30, further comprising using a switching circuit to select the threshold voltage in response to said second signal.

32. The method of claim 20, further comprising selecting an over-voltage protection limit for the power supply in response to the selection input.

33. A power supply for powering a microprocessor load, the microprocessor load generating digital voltage identification (VID) codes that determine the input voltage to be provided to the microprocessor load from the power supply, the power supply comprising:
    a voltage regulator for generating an output voltage to be provided as the input voltage for powering the microprocessor load, the voltage regulator being responsive to a reference voltage for setting the output voltage; and
    a VID control circuit for generating the reference voltage for the voltage regulator, the VID control circuit being responsive to the digital VID codes from the microprocessor load and to a selection input from one selection pin for selecting one of three or more microprocessor load types, each microprocessor load type having an assigned voltage range, the selection being performed using the one selection pin with respect to a common pin, whereby the selection input determines the type of microprocessor load to enable the VID codes to be evaluated by the VID control circuit to generate the reference voltage for the regulator, wherein a first type of microprocessor load is selected when the selection pin is at a first voltage range, a second type of microprocessor load is selected when the selection pin is at a second voltage range, and a third type of microprocessor load is selected when the selection pin is at a third voltage range.

34. The power supply of claim 33, wherein the VID control circuit comprises: a digital to analog converter receiving the selection input for converting an input VID code to the reference voltage.

35. The power supply of claim 34, wherein the VID control circuit further comprises: a plurality of VID input comparators having respective bits of the VID codes as inputs for comparing the respective bits to a threshold voltage.

36. The power supply of claim 35, wherein the plurality of VID input comparators each have one input coupled to a threshold voltage and a second input coupled to receive a respective bit of the VID code inputs, and wherein the threshold voltage is selectable from a plurality of threshold voltages in response to said selection input.

37. The power supply of claim 36, wherein said digital to analog converter receives inputs from said plurality of VID input comparators.

38. The power supply of claim 37, further comprising a buffer circuit receiving an output from said digital to analog converter and for providing said reference voltage to said regulator.

39. The power supply of claim 37, wherein the regulator comprises a switching regulator.

40. The power supply of claim 37, wherein the switching regulator comprises a buck converter.

41. The power supply of claim 40, wherein the switching regulator comprises a multiphase buck converter.

42. The power supply of claim 40, wherein the reference voltage is provided to an input of an error amplifier of said buck converter.

43. The power supply of claim 36, further comprising a comparator circuit receiving said selection input as an input, said comparator circuit providing a first signal to said digital to analog converter to enable said digital to analog converter to convert said VID codes to the reference voltage and further providing a second signal to said plurality of VID input comparators to select the threshold voltage for said plurality of VID input comparators.

44. The power supply of claim 43, wherein said plurality of VID input comparators further include a switching circuit responsive to said second signal to select the threshold voltage.

45. The power supply of claim 33, further comprising a circuit for selection of an over-voltage protection limit, the selection circuit comprising a comparator responsive to an OVP reference voltage and the output voltage of the power supply, the OVP reference voltage being selected by a selection switch responsive to the selection input, wherein the selection is performed using said one selection pin with respect to said common pin.

46. A method for powering a microprocessor load, the microprocessor load generating digital voltage identification (VID) codes that determine the input voltage to be provided to the microprocessor load from the power supply, the method comprising:

generating an output voltage to be provided as the input voltage for powering the microprocessor load in response to a reference voltage for setting the output voltage; and generating the reference voltage for the regulator in response to the digital VID codes from the microprocessor load and to a selection input from one selection pin for selecting one of three or more microprocessor load types, each microprocessor load type having an assigned voltage range, the selection being performed using the one selection pin with respect to a common pin, whereby the selection input determines the type of microprocessor load to enable the VID codes to be evaluated to generate the reference voltage for the regulator, wherein a first type of microprocessor load is selected when the selection pin is at a first voltage range, a second type of microprocessor load is selected when the selection pin is at a second voltage range, and a third type of microprocessor load is selected when the selection pin is at a third voltage range.

47. The method of claim 46, further comprising: receiving the selection input and converting a digital input VID code to the reference voltage.

48. The method of claim 47, further comprising: providing a plurality of VID input comparators having respective bits of the VID codes as inputs for comparing the respective bits to a threshold voltage.

49. The method of claim 47, wherein the plurality of VID input comparators each have one input coupled to a threshold voltage and a second input coupled to receive a respective bit of the VID code inputs, and further comprising selecting from a plurality of threshold voltages in response to said selection input.

50. The method of claim 49, wherein, prior to said step of converting, receiving inputs from said plurality of input VID comparators.

51. The method of claim 50, further comprising buffering said reference voltage and providing a buffered reference voltage to said regulator.

52. The method of claim 50, wherein the regulator comprises a switching regulator.

53. The method of claim 50, wherein the switching regulator comprises a buck converter.

54. The method of claim 53, wherein the switching regulator comprises a multiphase buck converter.

55. The method of claim 53, further comprising providing the reference voltage to an input of an error amplifier of said buck converter.

56. The method of claim 49, further comprising receiving said selection input as an input, and providing a first signal to enable a digital to analog converter to convert said VID codes to the reference voltage and further providing a second signal to said plurality of VID input comparators to select the threshold voltage for said plurality of VID input comparators.

57. The method of claim 56, further comprising using a switching circuit to select the threshold voltage in response to said second signal.

58. The method of claim 46, further comprising selecting an over-voltage protection limit for the power supply in response to the selection input.

59. The power supply of claim 1, wherein the first voltage range is the ground, the second voltage range is from 1.100 to 1.850V and the third voltage range is from 0.800 to 1.550V.

60. The method of claim 17, wherein the first voltage range is the ground, the second voltage range is from 1.100 to 1.850V and the third voltage range is from 0.800 to 1.550V.

61. The power supply of claim 33, wherein the first voltage range is the ground, the second voltage range is from 1.100 to 1.850V and the third voltage range is from 0.800 to 1.550V.

62. The method of claim 47, wherein the first voltage range is the ground, the second voltage range is from 1.100 to 1.850V and the third voltage range is from 0.800 to 1.550V.

* * * * *